(12) United States Patent
Hirose et al.

(10) Patent No.: US 11,340,472 B2
(45) Date of Patent: May 24, 2022

(54) OPTICAL DEVICE AND DISPLAY APPARATUS

(71) Applicant: Omron Corporation, Kyoto (JP)

(72) Inventors: Yuji Hirose, Kyoto (JP); Yutaka Okayasu, Kyoto (JP); Keiichiro Tanaka, Kyoto (JP); Yoshimasa Osumi, Aichi (JP); Yasuhiro Tanoue, Kyoto (JP); Mitsuru Okuda, Kyoto (JP)

(73) Assignee: Omron Corporation, Kyoto (JP)

( * ) Notice: Subject to any disclaimer, the term of this patent is extended or adjusted under 35 U.S.C. 154(b) by 446 days.

(21) Appl. No.: 16/341,603

(22) PCT Filed: Nov. 21, 2017

(86) PCT No.: PCT/JP2017/041881
§ 371 (c)(1),
(2) Date: Apr. 12, 2019

(87) PCT Pub. No.: WO2018/168087
PCT Pub. Date: Sep. 20, 2018

(65) Prior Publication Data
US 2021/0337180 A1 Oct. 28, 2021

(30) Foreign Application Priority Data
Mar. 14, 2017 (JP) .............................. JP2017-048641

(51) Int. Cl.
*G02B 30/26* (2020.01)
*H04N 13/317* (2018.01)
(Continued)

(52) U.S. Cl.
CPC ............. *G02B 30/26* (2020.01); *G02B 30/32* (2020.01); *H04N 13/317* (2018.05); *H04N 13/359* (2018.05)

(58) Field of Classification Search
CPC ..... H04N 13/317; H04N 13/359; G02B 30/32
(Continued)

(56) References Cited

U.S. PATENT DOCUMENTS

2011/0249199 A1 10/2011 Ishii
2014/0268327 A1 9/2014 Dunn et al.
(Continued)

FOREIGN PATENT DOCUMENTS

CN  102213905 A  10/2011
JP  2008-27665 A  2/2008
(Continued)

OTHER PUBLICATIONS

Office Action in counterpart Japanese Application No. 2017-048641 dated Dec. 17, 2019 (5 pages).
(Continued)

*Primary Examiner* — On S Mung
(74) *Attorney, Agent, or Firm* — Osha Bergman Watanabe & Burton LLP

(57) ABSTRACT

A first stereoscopic image display device includes a light guide plate having a plurality of reflectors and causes an observer to recognize an undistorted stereoscopic image even when the observer views a stereoscopic image from a high angle with respect to a direction normal to the front surface of the light guide plate. In a plan view from a direction vertical to an outgoing surface, when four quadrants are specified for each of the reflectors, the four quadrants taking a position of each of the reflectors as an origin, the four quadrants being divided by two straight lines orthogonal to each other and inclined 45° with respect to a direction in which the incident light is incident on each of the reflectors, light changed in the optical path by each of the reflectors is emitted to a quadrant adjacent to a quadrant on which incident light is incident.

15 Claims, 14 Drawing Sheets

(51) Int. Cl.
*H04N 13/359* (2018.01)
*G02B 30/32* (2020.01)

(58) Field of Classification Search
USPC .......................................... 348/51
See application file for complete search history.

(56) References Cited

U.S. PATENT DOCUMENTS

2015/0131316 A1   5/2015  Takagi et al.
2017/0192244 A1   7/2017  Shinohara et al.

FOREIGN PATENT DOCUMENTS

| JP | 2012-118378 A | 6/2012 |
| JP | 2015-94833 A | 5/2015 |
| JP | 2016-114929 A | 6/2016 |
| JP | 2016-180726 A | 10/2016 |
| JP | 2016-180776 A | 10/2016 |

OTHER PUBLICATIONS

International Search Report issued in Application No. PCT/JP2017/041881, dated Feb. 13, 2018, (1 page).
Written Opinion issued in International Application No. PCT/JP2017/041881, dated Feb. 13, 2018 (8 pages).
Office Action issued in Chinese Application No. 201780062117.4; dated Oct. 12, 2020 (12 pages).

OPTICAL DEVICE AND DISPLAY APPARATUS

TECHNICAL FIELD

The present invention relates to an optical device and a display apparatus that displays a stereoscopic image.

BACKGROUND ART

As an optical device for displaying a stereoscopic image, for example, an image display apparatus disclosed in Patent Document 1 is hitherto known.

The image display apparatus disclosed in Patent Document 1 includes: a light guide plate; a light source provided at the end of the light guide plate; a first display pattern having a plurality of first prisms formed on the rear surface of the light guide plate; and a second display pattern having a plurality of second prisms formed on the rear surface of the light guide plate. The first display pattern forms a first image on the front surface side of the light guide plate with the plurality of first prisms and the second display pattern forms the second image on the front surface side of the light guide plate with the plurality of second prisms.

With this configuration, by appropriately setting the shapes (mainly the reflective surfaces) of the first prisms and the second prisms of the respective display patterns, for example, it is possible to generate a first image for the observer's right eye to visually recognize and a second image for the observer's left eye to visually recognize. This makes it possible to cause the observer to recognize a stereoscopic image in a natural state without forcing the observer to perform an unnatural movement for fusion.

PRIOR ART DOCUMENT

Patent Document

Patent Document 1: Japanese Unexamined Patent Publication No. 2012-118378 (published on Jun. 21, 2012)

SUMMARY OF THE INVENTION

Problems to be Solved by the Invention

However, in the image display apparatus described in Patent Document 1, when an observer views a stereoscopic image from an angle being a high angle (e.g., 45° or higher) with respect to the direction normal to the front surface of the light guide plate, the stereoscopic image appears distorted.

The reason for this is as follows. That is, as illustrated in FIGS. 21(a) and 21(b), when an outgoing angle of light with respect to the direction normal to the outgoing surface of the light guide plate is γ, the spreading sensitivity to the shape of the stereoscopic image at an outgoing angle γ of 30° is about 1, which is small. However, at an outgoing angle γ of 75°, the spreading sensitivity to the shape of the stereoscopic image is about 19, which is large. The spreading sensitivity to the shape of the stereoscopic image abruptly increases from an outgoing angle γ of 60°. As a result, a shape error has a great influence on blurring in a high viewing angle portion at an outgoing angle γ of 60° or higher. Here, the spreading sensitivity means a ratio of an amount of change in an outgoing angle at the time when a light guide angle of light emitted in each direction changes by a minute amount in the light guide plate with respect to an amount of change in the outgoing angle at the time when a light guide angle of light emitted in the direction of 0°, which is the direction normal to the outgoing surface, changes by a minute amount in the light guide plate. It is assumed that, when the outgoing angle is 0°, the spreading sensitivity is 1.

It is an object of one aspect of the present invention to achieve an optical device capable of causing an observer to recognize an undistorted stereoscopic image, even when the observer views a stereoscopic image from an angle being a high angle with respect to a direction normal to the front surface of a light guide plate.

Means for Solving the Problem

In order to solve the above problem, an optical device according to one aspect of the present invention is provided with a light guide plate configured to guide incident light and emit the light from an outgoing surface. The light guide plate includes a plurality of optical path changing units each configured to change an optical path of the light guided into the light guide plate and emit the light from the outgoing surface, and the device causes an observer to recognize the light changed in the optical path by each of the plurality of optical path changing units and emitted from the outgoing surface as a stereoscopic model. When four quadrants are specified for each of the optical path changing units, the four quadrants taking a position of the optical path changing unit as an origin in a plan view from a direction vertical to an outgoing surface, the four quadrants being divided by two straight lines orthogonal to each other and inclined 45° with respect to a direction in which the incident light is incident on the optical path changing unit, the light changed in the optical path by the optical path changing unit is emitted to a quadrant adjacent to a quadrant on which incident light is incident.

Effect of the Invention

According to one aspect of the present invention, it is possible to cause an observer to recognize an undistorted stereoscopic image, even when the observer views a stereoscopic image from an angle being a high angle with respect to a direction normal to the front surface of a light guide plate.

BRIEF DESCRIPTION OF THE DRAWINGS

FIG. 2(a) is a view of the display apparatus viewed from the left, FIG. 2(b) is a view of the display apparatus viewed from the front, and FIG. 2(c) is a view of the display apparatus viewed from above.

MODE FOR CARRYING OUT THE INVENTION

First Embodiment

A display apparatus 1A in a first embodiment of the present invention will be described in detail with reference to FIGS. 1 to 14.

Configuration of Display Apparatus 1A

Figure 1:
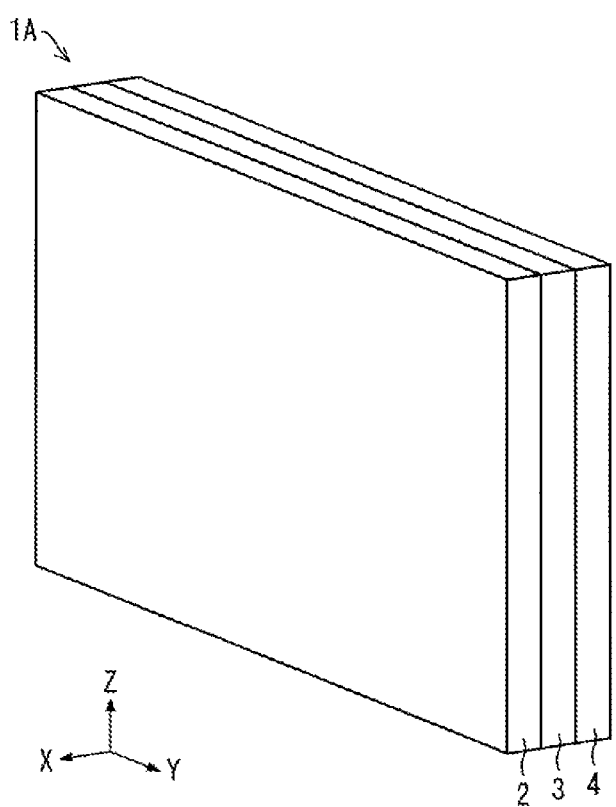
FIG. 1 is a perspective view illustrating a configuration of a display apparatus according to a first embodiment of the present invention.
Figure 2:
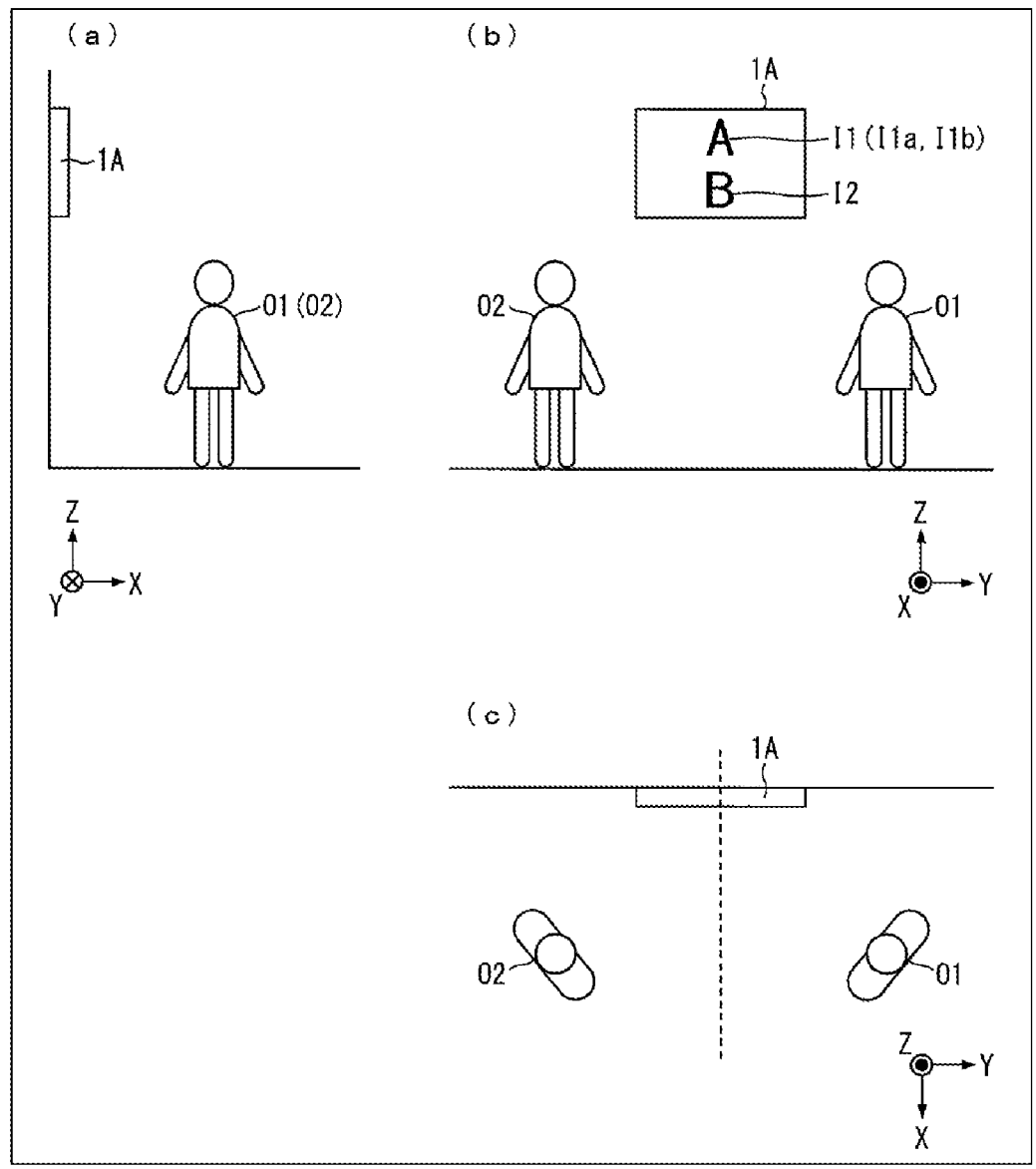
FIGS. 2(a) to 2(c) illustrate a state in which the display apparatus is attached to a wall.

FIG. 1 is a perspective view illustrating the external appearance of the display apparatus 1A. In the following, a description will be given taking a +X direction in FIG. 1 as the front direction, a −X direction as the rear direction, a +Y direction as the right direction, a −Y direction as the left direction, a +Z direction as the up direction, a −Z direction as the down direction.

As illustrated in FIG. 1, the display apparatus 1A includes a first stereoscopic image display device (optical device) 2, a second stereoscopic image display device (optical device) 3, and a two-dimensional image display device 4. The first stereoscopic image display device 2, the second stereoscopic image display device 3, and the two-dimensional image display device 4 have substantially the same size in a direction parallel to a YZ plane, and the first stereoscopic image display device 2, the second stereoscopic image display device 3, and the two-dimensional image display device 4 are superimposed in this order from the front and stored in a casing (not illustrated).

FIGS. 2(a) to 2(c) illustrate a state in which the display apparatus 1A is attached to a wall. FIG. 2(a) is a view of the display apparatus 1A viewed from the left, FIG. 2(b) is a view of the display apparatus 1A viewed from the front, and FIG. 2(c) is a view of the display apparatus 1A viewed from above.

As illustrated in FIGS. 2(a) to 2(c), the display apparatus 1A is attached to an upper portion of a corridor wall at a hotel, a commercial facility, or the like, for example. As illustrated in FIG. 2(b), in the display apparatus 1A, the first stereoscopic image display device 2 and the second stereoscopic image display device 3 display a stereoscopic image (stereoscopic model) I1 (a letter "A" in the present embodiment) at the front of the display apparatus 1A. Furthermore, in the display apparatus 1A, the two-dimensional image display device 4 displays a two-dimensional image I2 (a letter "B" in the present embodiment) at the front of the display apparatus 1A. More specifically, the first stereoscopic image display device 2 displays a stereoscopic image (stereoscopic model) I1a that is visually recognized by an observer O1 in the range below the display apparatus 1A, in front of the display apparatus 1A, and on the right side from the horizontal center of the display apparatus 1A, and the second stereoscopic image display device 3 displays a stereoscopic image (stereoscopic model) I1b that is visually recognized by an observer O2 in the range below the display apparatus 1A, in front of the display apparatus 1A, and on the left side from the horizontal center of the display apparatus 1A. Hereinafter, the details of the first stereoscopic image display device 2, the second stereoscopic image display device 3, and the two-dimensional image display device 4 will be described.

First Stereoscopic Image Display Device 2 and
Second Stereoscopic Image Display Device 3

The first stereoscopic image display device 2 and the second stereoscopic image display device 3 will be described with reference to FIGS. 3 to 11. Since the first stereoscopic image display device 2 and the second stereoscopic image display device 3 have structures symmetrical to each other, the detail of the first stereoscopic image display device 2 will be described here, and concerning the difference of the second stereoscopic image display device 3, only the difference from the first stereoscopic image display device 2 will be described.

Figure 3:
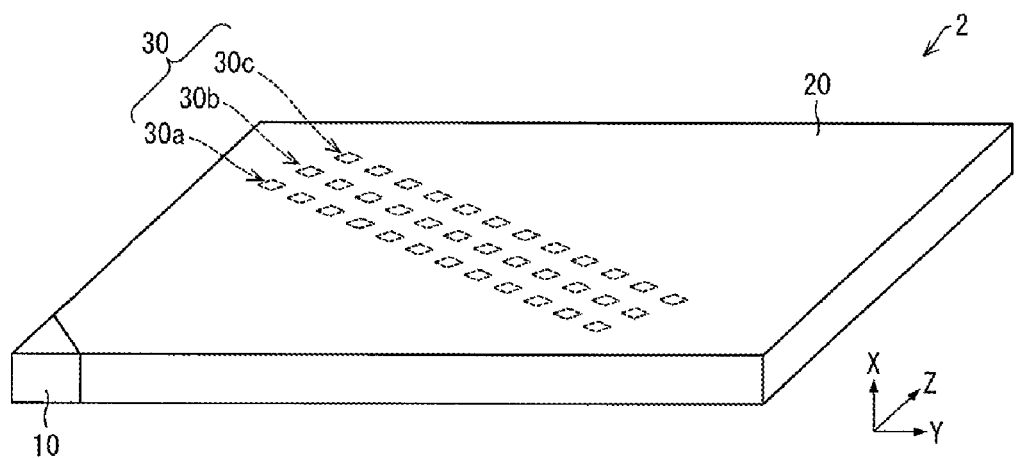
FIG. 3 is a perspective view illustrating a configuration of a first stereoscopic image display device provided in the display apparatus.
Figure 4:
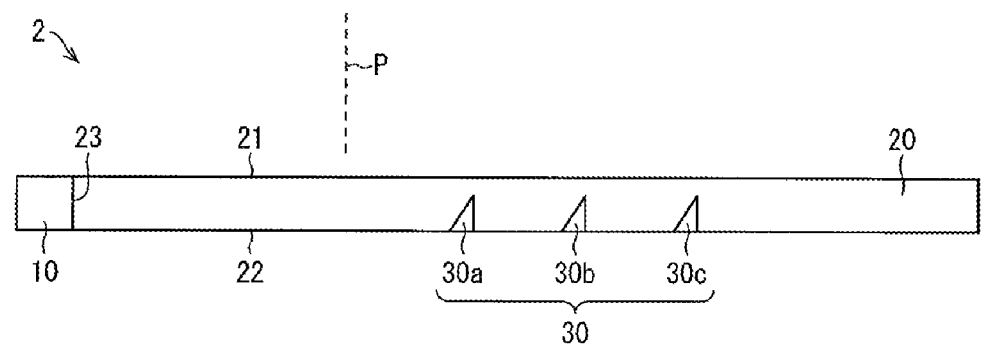
FIG. 4 is a sectional view of the first stereoscopic image display device taken along a cross section vertical to the outgoing surface through a light source.
Figure 5:
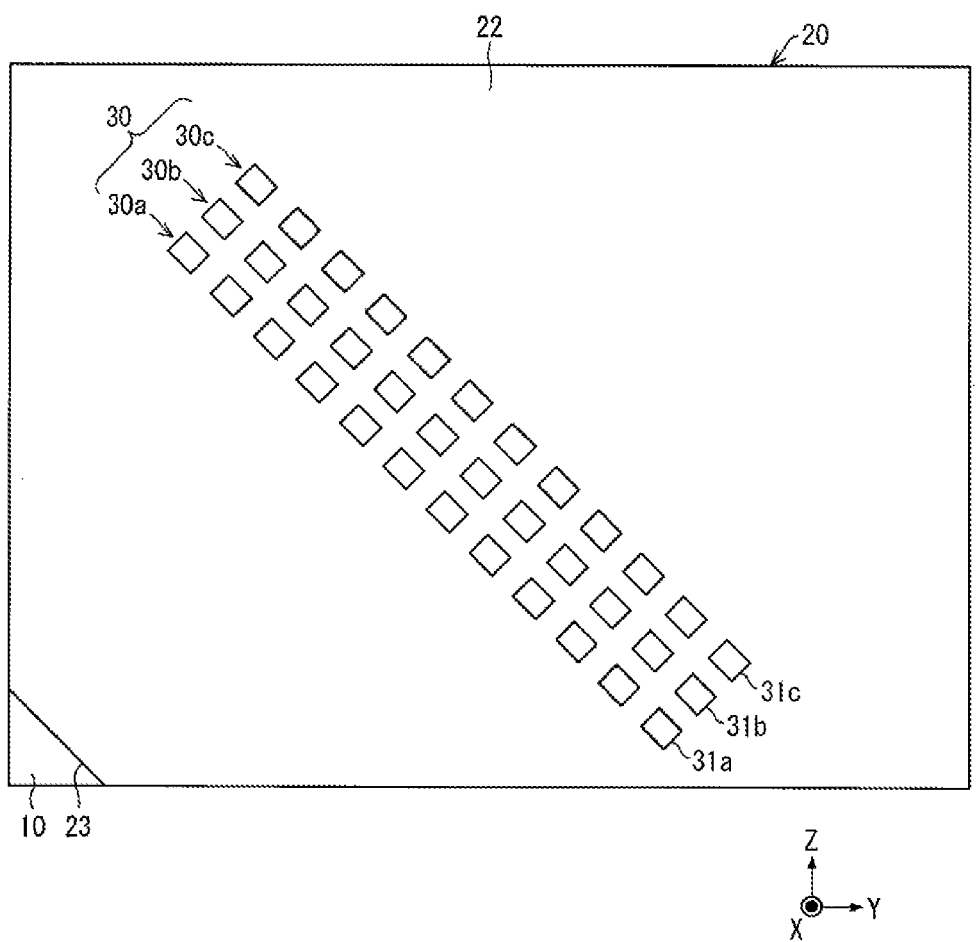
FIG. 5 is a plan view illustrating the configuration of the first stereoscopic image display device.
Figure 6:
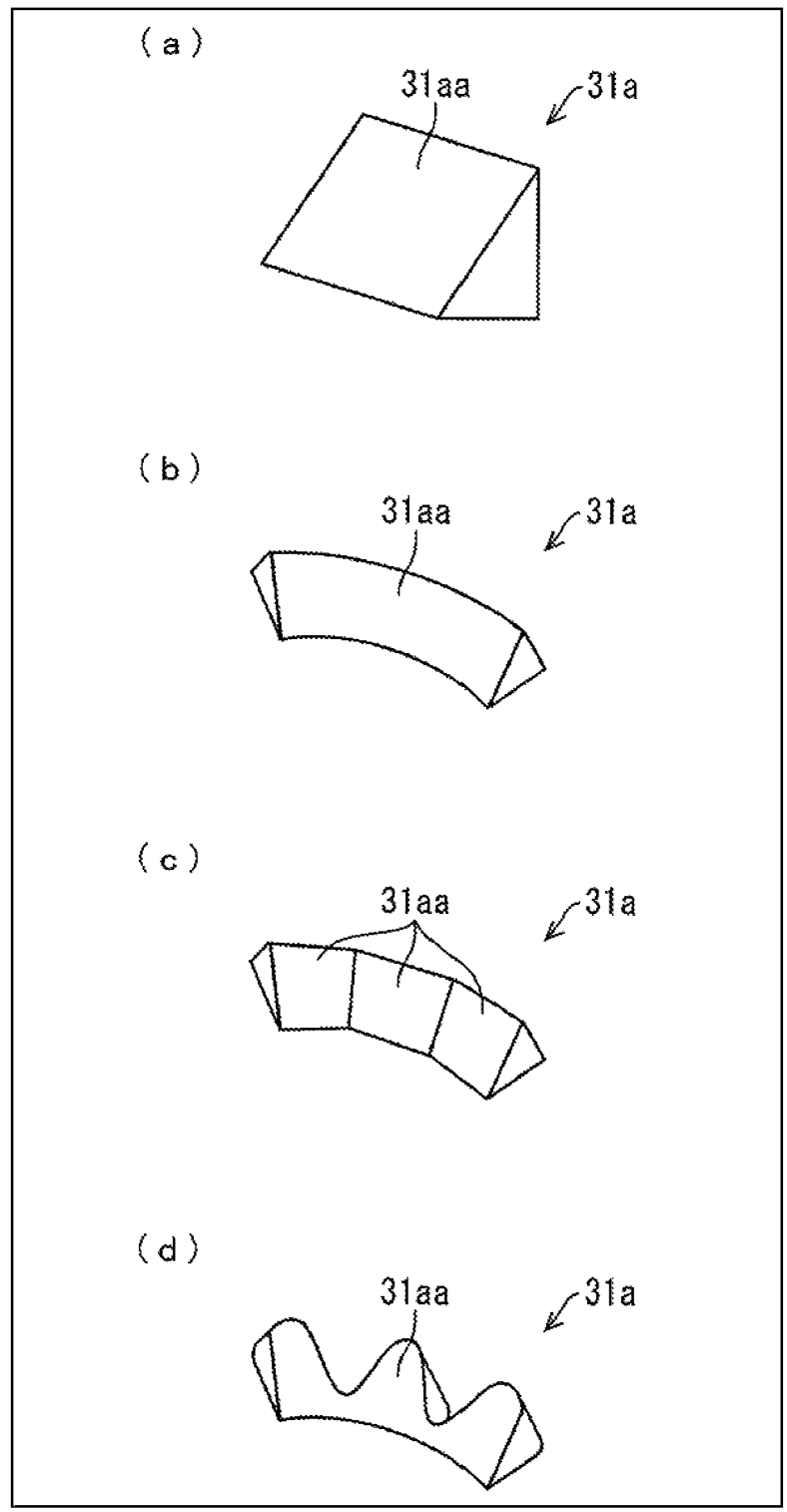
FIG. 6(a) is a perspective view illustrating a structure of a reflector included in the first stereoscopic image display device.
FIGS. 6(b) to 6(d) are perspective views each illustrating a structure of a modified example of the reflector.

FIG. 3 is a perspective view illustrating the configuration of the first stereoscopic image display device 2. FIG. 4 is a sectional view of the first stereoscopic image display device 2 taken along a cross section vertical to an outgoing surface 21 through a light source 10. FIG. 5 is a plan view illustrating a configuration of the first stereoscopic image display device 2.

As illustrated in FIGS. 3 to 5, the first stereoscopic image display device 2 includes a light source 10 and a light guide plate 20.

The light source 10 is a member for irradiating the light guide plate 20 with light and is formed of, for example, a light emitting diode (LED). The light source 10 may be configured to include one light emitting diode or may be configured to collimate light emitted from each of a plurality of light emitting diodes. The light source 10 is disposed at the lower left of the light guide plate 20.

The light guide plate 20 is a member that guides light (incident light) incident from the light source 10 and has a substantially rectangular parallelepiped shape. The light guide plate 20 is molded with a transparent resin material having a relatively high refractive index. As a material for forming the light guide plate 20, for example, a polycarbonate resin, a methacrylate resin, or the like can be used. In the present embodiment, the light guide plate 20 is molded with a methacrylate resin.

As illustrated in FIG. 4, the light guide plate 20 includes an outgoing surface 21, a rear surface 22, and an incident surface 23.

The outgoing surface 21 is a surface that emits light guided inside the light guide plate 20, the light changed in its optical path by a first optical path changing unit 30 described later. The outgoing surface 21 constitutes the front-side surface (front surface) of the light guide plate 20 and the front-side surface of the display apparatus 1A.

The rear surface 22 is a surface parallel to the outgoing surface 21 and is a surface on which the first optical path changing unit 30 is disposed. The detail of the first optical path changing unit 30 will be described later.

The incident surface 23 is a surface where light emitted from the light source 10 enters the inside of the light guide plate 20. The incident surface 23 is a flat surface formed by cutting out the lower left portion of the side surface connecting the outgoing surface 21 and the rear surface 22. In the first stereoscopic image display device 2, light emitted from the light source 10 is incident on the light guide plate 20 from the lower left of the light guide plate 20. In the present embodiment, the incident surface 23 is formed so as to form an angle of 45° with the XY plane and the XZ plane.

The first optical path changing unit 30 is disposed on the rear surface 22 inside the light guide plate 20 and is a member for changing the optical path of the light guided in the light guide plate 20 to emit the light from the outgoing surface 21. As illustrated in FIG. 3, the first optical path changing unit 30 is made up of optical path changing unit groups 30a, 30b, 30c . . . . Note that FIGS. 3 to 5 only illustrate the optical path changing unit groups 30a to 30c for the sake of simplicity.

Each of the optical path changing unit groups 30a, 30b, 30c . . . is formed of a plurality of reflectors (prisms, optical path changing units). For example, the optical path changing unit group 30a is made up of a plurality of reflectors (optical path changing units) 31a. Similarly, the optical path changing unit groups 30b, 30c . . . are made up of a plurality of reflectors (optical path changing units) 31b, 31c . . . , respectively.

FIG. 6(a) is a perspective view illustrating the structure of the reflector 31a and FIGS. 6(b) to 6(d) are perspective views each illustrating a structure of a modified example of the reflector 31a. Since the reflectors 31b, 31c . . . have the same structure as the reflector 31a, only the reflector 31a will be described here, and the description of the reflectors 31b, 31c . . . will be omitted.

As illustrated in FIG. 6(a), the reflector 31a has a triangular pyramidal shape and has a reflective surface 31aa that reflects (totally reflects) the incident light. As illustrated in FIG. 4, the reflective surface 31aa is formed so that an angle formed between the reflective surface 31aa and the outgoing surface 21 or the rear surface 22 of the light guide plate 20 is equal to or larger than a predetermined angle (48° in the present embodiment). Note that the reflector 31a of the present invention is not necessarily limited to a triangular pyramid shape. For example, as illustrated in FIGS. 6(b) to 6(d), the reflector 31a of one aspect of the present invention may be a reflector having an arcuate triangular pyramid formed into a circular shape, a triangular pyramid formed into a circular shape with an inflected portion added thereto, or a triangular pyramid with one side formed in a wave shape.

Figure 7:
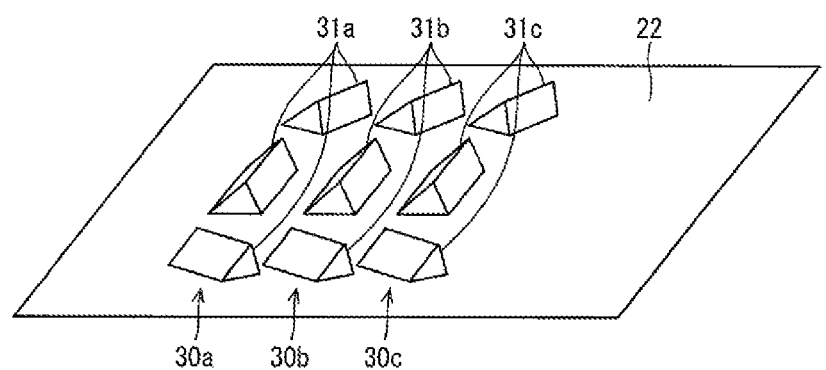
FIG. 7 is a perspective view illustrating the arrangement of reflectors formed on a light guide plate in the first stereoscopic image display device.
Figure 8:
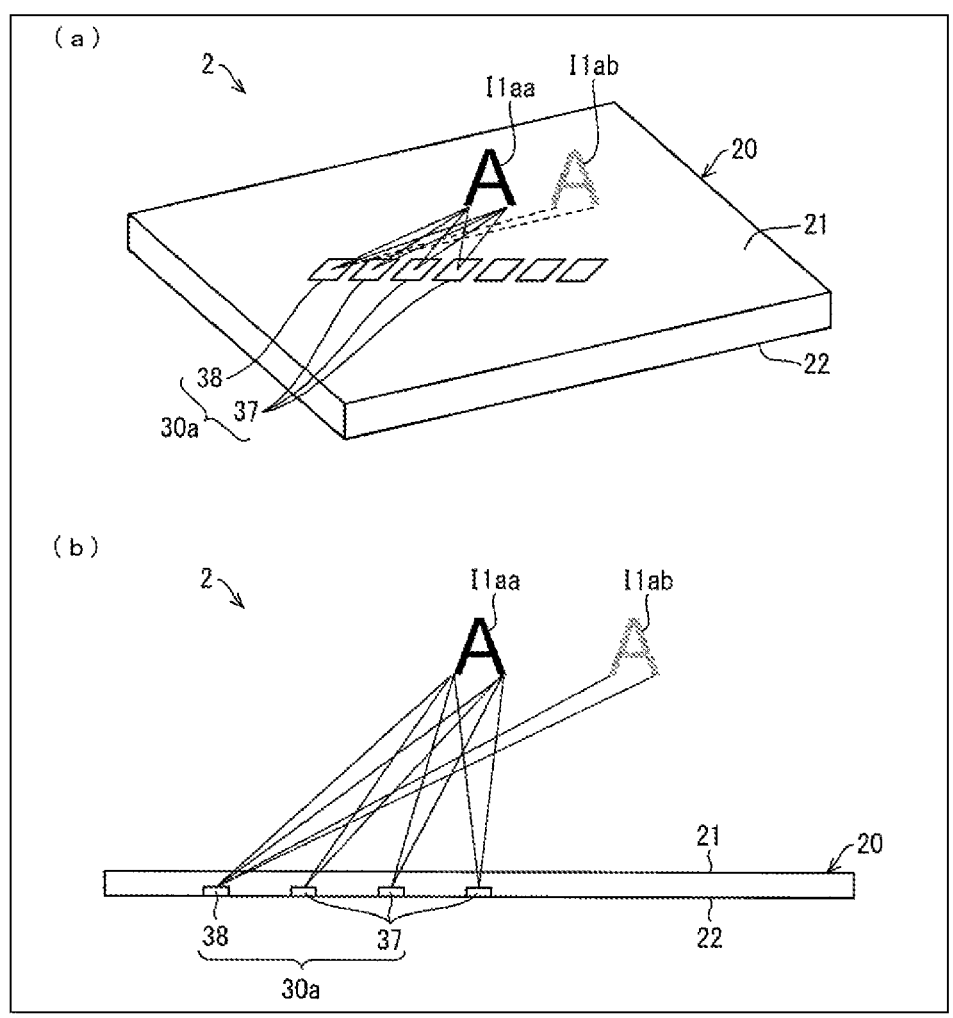
FIG. 8(a) is a perspective view illustrating how the first stereoscopic image display device forms a low viewing angle side stereoscopic image and a high viewing angle side stereoscopic image in the space.
FIG. 8(b) is a sectional view in a direction in which the reflectors are arranged, illustrating how the first stereoscopic image display device forms the low viewing angle side stereoscopic image and the high viewing angle side stereoscopic image in the space.

FIG. 7 is a perspective view illustrating the arrangement of the reflectors 31a, 31b, 31c formed on the light guide plate 20 in the first stereoscopic image display device 2.

As illustrated in FIG. 7, in the respective optical path changing unit groups 30a, 30b, 30c . . . , reflective surfaces 31aa, 31ba, 31ca . . . of the plurality of reflectors 31a, 31b, 31c . . . are arranged on the rear surface 22 of the light guide plate 20 so that the angles thereof with respect to the incident direction of the light are different from each other. Hence each of the optical path changing unit groups 30a, 30b, 30c . . . changes the optical path of the incident light and emits the light from the outgoing surface 21 in various directions parallel to the incident surface 23

FIG. 8(a) is a perspective view illustrating how a low viewing angle side stereoscopic image I1aa and a high viewing angle side stereoscopic image I1ab are formed as the stereoscopic image I1a in the space, and FIG. 8(b) is a sectional view in a direction in which the reflectors 31a are arranged, illustrating how the low viewing angle side stereoscopic image I1aa and the high viewing angle side stereoscopic image I1ab are formed in the space. Note that FIGS. 8(a) and 8(b) illustrate only the optical path changing unit group 30a among the optical path changing unit groups 30a, 30b, 30c . . . .

As illustrated in FIGS. 8(a) and 8(b), the plurality of optical path changing unit groups 30a includes, as the reflectors 31a, a low viewing angle optical path deflecting unit group 37 and a high viewing angle optical path deflecting unit group 38. The low viewing angle optical path deflecting unit group 37 forms the low viewing angle side stereoscopic image I1aa as the stereoscopic image I1a in the space in a low viewing angle direction at an angle of not lower than 0 degree and lower than a predetermined angle with respect to a reference plane orthogonal to the outgoing surface 21 of the light guide plate 20 and parallel to the direction in which the reflectors 31a are arranged. The high viewing angle optical path deflecting unit group 38 forms the high viewing angle side stereoscopic image I1ab as the stereoscopic image I1b in the space in a high viewing angle direction at an angle of not lower than the predetermined angle and lower than 90 degrees with respect to the reference plane.

Next, a method for forming the stereoscopic image I1a by the first stereoscopic image display device 2 will be described with reference to FIG. 9.

Figure 9:
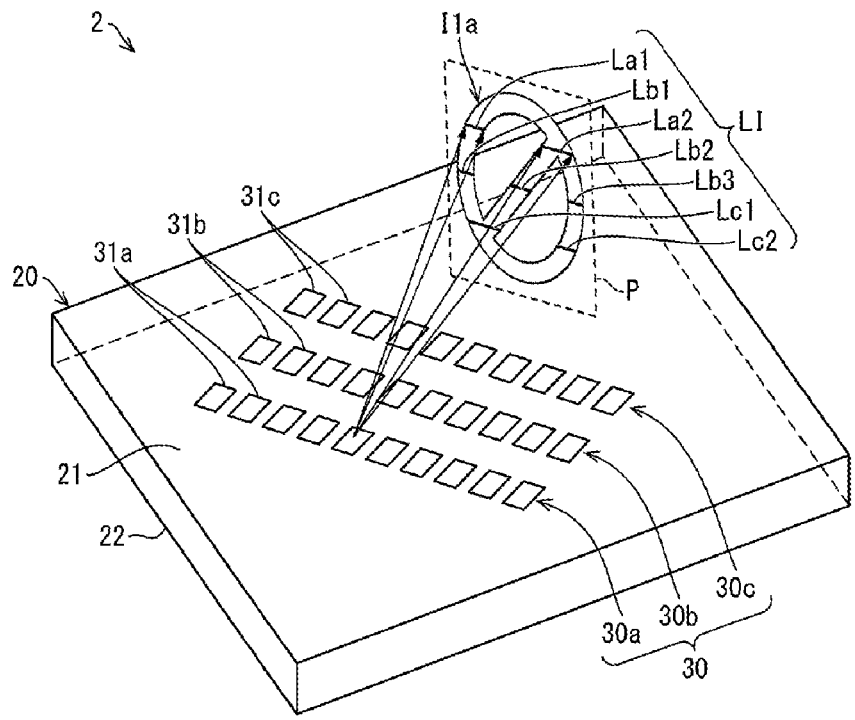
FIG. 9 is a perspective view illustrating a method for forming a stereoscopic image by the stereoscopic image display device.

FIG. 9 is a perspective view illustrating a method for forming the stereoscopic image I1a by the first stereoscopic image display device 2. Here a description will be given of the first stereoscopic image display device 2 forming an oblique line-containing ring mark as the stereoscopic image I1a on the stereoscopic image formed plane P existing in front of the first stereoscopic image display device 2.

As illustrated in FIG. 9, in the first stereoscopic image display device 2, for example, light changed in its optical path by each reflector 31a of the optical path changing unit group 30a intersects a stereoscopic image formed plane P, present in front of the first stereoscopic image display device 2, at the line La1 or the line La2. Thereby, a line image LI which is a part of the stereoscopic image I1a is formed on the stereoscopic image formed plane P. The line image LI is a line image parallel to the YZ plane. In this way, the line image LI of the line La1 and the line La2 is formed by the light from each of the large number of reflectors 31a belonging to the optical path changing unit group 30a. Note that the light for forming the images of the lines La1, La2 may be provided by at least two reflectors 31a in the optical path changing unit group 30a.

Likewise, light changed in its optical path by each reflector 31b of the optical path changing unit group 30b intersects the stereoscopic image formed plane P at the lines Lb1, Lb2 or Lb3. Thereby, a line image LI which is a part of the stereoscopic image I1a is formed on the stereoscopic image formed plane P.

Further, light changed in its optical path by each reflector 31c of the optical path changing unit group 30c intersects the stereoscopic image formed plane P at the line Lc1 or Lc2. Thereby, a line image LI which is a part of the stereoscopic image I1a is formed on the stereoscopic image formed plane P.

The positions in the X-axis direction of the line images formed by the optical path changing unit groups 30a, 30b, 30c . . . are different from each other. In the first stereoscopic image display device 2, by reducing the distances among the optical path changing unit groups 30a, 30b, 30c . . . , the distance in the X-axis direction of the line image LI to be formed by each of the optical path changing unit groups 30a, 30b, 30c . . . can be reduced. As a result, in the first stereoscopic image display device 2, by accumulating a plurality of line images LI each formed by the light changed in its optical path by each of the reflectors 31a, 31b, 31c . . . of the optical path changing unit groups 30a, 30b, 30c . . . , the stereoscopic image I1a is substantially formed on the stereoscopic image formed plane P.

Note that the stereoscopic image formed plane P may be a plane vertical to the X-axis, a plane vertical to the Y-axis, or a plane vertical to the Z-axis. Further, the stereoscopic image formed plane P may be a plane that is not vertical to the X-axis, the Y-axis, or the Z-axis. Moreover, the stereoscopic image formed plane P may be a curved surface instead of a plane. That is, the first stereoscopic image display device 2 can form the stereoscopic image I1a on any plane (plane and curved plane) on the space.

Next, the outgoing direction of the light reflected by each of the reflectors 31a, 31b, 31c . . . in the first stereoscopic image display device 2 and emitted from the outgoing surface 21 will be described with reference to FIGS. 10 and 11.

Figure 10:
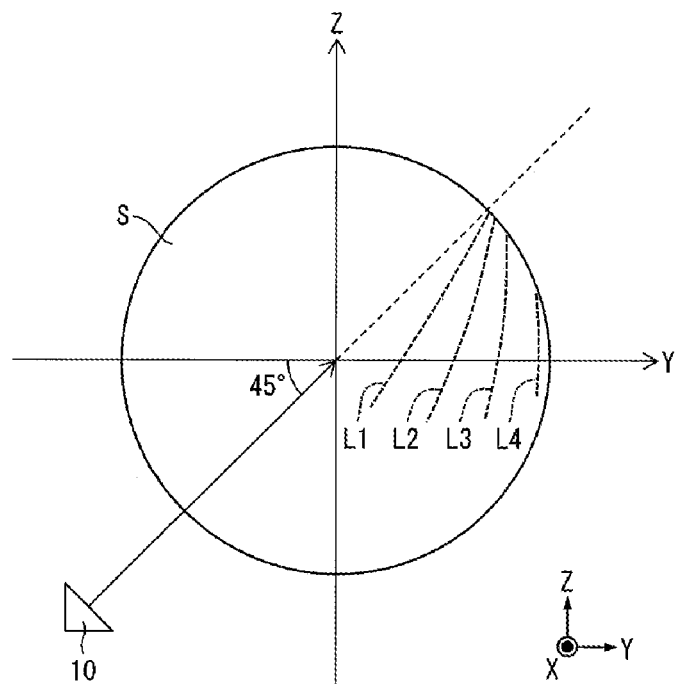
FIG. 10 is a view for explaining an outgoing direction of light reflected by the reflector and emitted from the outgoing surface.
Figure 11:
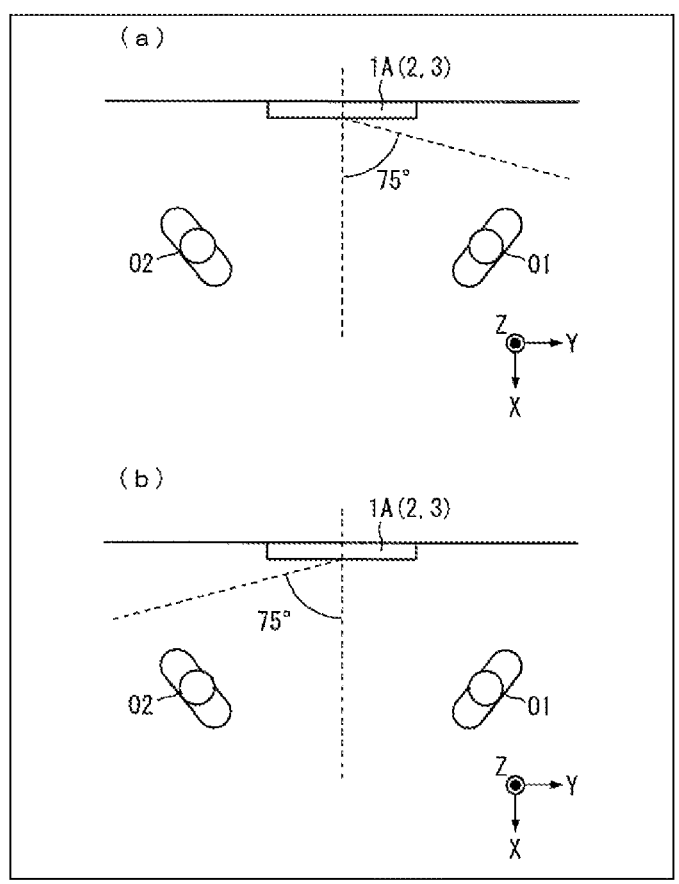
FIG. 11(a) is a top view illustrating a range in which an observer can visually recognize a stereoscopic image formed by the first stereoscopic image display device.
FIG. 11(b) is a top view illustrating a range in which the observer can visually recognize a stereoscopic image formed by a second stereoscopic image display device provided in the display apparatus.

FIG. 10 is a view (celestial view) for explaining the outgoing direction of light emitted from the outgoing surface 21 after being reflected by the reflectors 31a, 31b, 31c . . . . The YZ plane illustrated in FIG. 10 corresponds to the outgoing surface 21, and the circle illustrated in FIG. 10 represents a spherical surface S centered at each of the reflectors 31a, 31b, 31c . . . on which the light from the light source 10 has been incident.

Here, when the YZ plane is viewed in a plan view, an angle formed between (1) and (2) as follows: (1) a line vertical to a line at which each of the reflective surfaces 31aa, 31ba, 31ca . . . of the reflectors 31a, 31b, 31c . . . intersects a plane parallel to the YZ plane; and (2) the incident direction of the light is defined as the rotation angle of each of the reflectors 31a, 31b, 31c . . . . For example, when the YZ plane is viewed in a plan view at a rotation angle of 0°, the light is vertically incident on each of the reflectors 31a, 31b, 31c . . . . At this time, dotted lines L1 to L4 illustrated in FIG. 10 each indicate the position at which each of the light reflected by the reflectors 31a, 31b, 31c . . . intersects the spherical surface S when the rotation angles of the reflectors 31a, 31b, 31c . . . are angles of 10°, 20°, 30°, and 40°. For the convenience of description, a description will be given diving the space on the side from which the light is emitted from the light guide plate 20 (i.e., the space in the +X-axis direction from the light guide plate 20) into four quadrants (a first quadrant to a fourth quadrant). The following assumption is made: the first quadrant is a space in which both the Y coordinate and the Z coordinate are positive; the second quadrant is a space in which the Y coordinate is negative, and the Z coordinate is positive; the third quadrant is a space in which both the Y coordinate and the Z coordinate are negative; and the fourth quadrant is a space in which the Y coordinate is positive, and the Z coordinate is negative. In other words, the first quadrant to the fourth quadrant are four quadrants taking the position of each of the reflectors 31a, 31b, 31c . . . (the positions where the light is reflected) as the origin and formed of two planes orthogonal to the light guide plate 20 and orthogonal to each other.

FIG. 11(a) is a top view illustrating a range in which the observer O1 can visually recognize the stereoscopic image I1a formed by the first stereoscopic image display device 2, and FIG. 11(b) is a top view illustrating a range in which the observer O2 can visually recognize a stereoscopic image I1a formed by the second stereoscopic image display device 3.

A case will be described in which light is incident on each of the reflectors 31a, 31b, 31c . . . at an angle of 45° with respect to the Y-axis and the Z-axis from the light source 10 existing in the third quadrant, as illustrated in FIG. 10. As described above, the first stereoscopic image display device 2 is formed so that an angle formed between each of the reflective surfaces 31aa, 31ba, 31ca . . . and the outgoing surface 21 or the rear surface 22 of the light guide plate 20 is equal to or larger than a predetermined angle (48° in the present embodiment). As a result, a part of the light reflected by each of the reflective surfaces 31aa, 31ba, 31ca . . . can be emitted from the outgoing surface 21 toward the fourth quadrant (as illustrated in FIG. 10, a part of each of the dotted lines L1 to L4 is present in the fourth quadrant).

In other words, in a plan view from the direction vertical to the outgoing surface 21, when the four quadrants taking the position of each of the reflectors 31a, 31b, 31c . . . as the origin are specified, the four quadrants being divided by two straight lines orthogonal to each other and inclined 45° with respect to the direction in which the incident light from the light source 10 is incident on each of the reflectors 31a, 31b, 31c . . . , the light reflected by each of the reflectors 31a, 31b, 31c . . . is emitted to the quadrant (fourth quadrant) adjacent to a quadrant (third quadrant) on which the incident light is incident.

As a result, in the first stereoscopic image display device 2, as illustrated in FIG. 11(a), by each light emitted toward the fourth quadrant, the stereoscopic image I1a can be formed in the space in front of the light guide plate 20 and on the right side with respect to the direction normal to the front surface of the light guide plate 20. At this time, since the light source 10 is disposed at the lower left of the light guide plate 20, when the YZ plane is viewed in a plan view, it is possible to reduce the angle formed between the line normal to each of the reflective surfaces 31aa, 31ba, 31ca . . . and the incident direction of the incident light. That is, it is possible to reduce the angle formed between the incident direction of the incident light on each of the reflectors 31a, 31b, 31c . . . and the outgoing direction of the outgoing light from each of the reflectors 31a, 31b, 31c. As a result, the spreading sensitivity to the shape of the stereoscopic image I1a can be reduced, so that it is possible to cause the observer O1 to recognize the undistorted stereoscopic image I1a, even when the observer O1 views the stereoscopic image I1a from an angle being a high angle with respect to the direction normal to the front surface of the light guide plate 20.

In addition, in the first stereoscopic image display device 2, each light emitted toward the fourth quadrant forms the stereoscopic image I1a in the air which is visually recognized by the observer O1 being in the range below the display apparatus 1A, in front of the display apparatus 1A, and on the right side from the horizontal center of the display apparatus 1A. Accordingly, when the display apparatus 1A is installed at a position higher than the eye level of the observer O1, the observer O1 can visually recognize the stereoscopic image I1a.

In the display apparatus 1A according to the present embodiment, the first stereoscopic image display device 2 has formed the stereoscopic image I1a that is a real image on the stereoscopic image formed plane P existing in front of the first stereoscopic image display device 2. However, the display apparatus of the present invention is not limited to this. In the display apparatus according to one aspect of the present invention, the first stereoscopic image display device may form a virtual image with the light reflected by each of the reflectors 31a, 31b, 31c . . . and, for example, display a stereoscopic image that penetrates the outgoing surface 21.

In addition, as described above, the second stereoscopic image display device 3 has the structure symmetrical to the first stereoscopic image display device 2. With this configuration, as illustrated in FIG. 11(b), the second stereoscopic image display device 3 can form the stereoscopic image I1b in the space in front of the display apparatus 1A and on the left side with respect to the direction normal to the front surface of the display apparatus 1A. Further, even when the observer O2 views the stereoscopic image I1b from an angle being a high angle with respect to the direction normal to the front surface of the display apparatus 1A, the observer O2 can recognize the undistorted stereoscopic image I1b. Moreover, when the display apparatus 1A is installed at a position higher than the eye level of the observer O2, the observer O2 can view the stereoscopic image I1b.

As described above, the display apparatus 1A is configured to superimpose the first stereoscopic image display device 2 and the second stereoscopic image display device 3, and the angular ranges in which the first stereoscopic image display device 2 and the second stereoscopic image display device 3 emit light are symmetrical (different from each other). It is thereby possible to display the same stereoscopic images I1a, I1b in angular ranges different from each other (specifically, the front direction of the display apparatus 1A is taken as 0° and the stereoscopic image I1 at an angle in a wide range (e.g., from −75° to 75°) on a plane parallel to the XY plane).

In the display apparatus 1A of the present embodiment, the aspect has been described where the first stereoscopic image display device 2 and the second stereoscopic image display device 3 display the same stereoscopic image I1, but the display apparatus 1A of the present invention is not limited thereto. That is, in one aspect of the display apparatus of the present invention, the first stereoscopic image display device 2 and the second stereoscopic image display device 3 may respectively display the stereoscopic image I1a and the stereoscopic images I1b different from each other.

Two-Dimensional Image Display Device 4

Next, the two-dimensional image display device 4 will be described with reference to FIGS. 12 to 14. The two-dimensional image display device 4 displays the two-dimensional image I2 on the front surface (an outgoing surface 71 described later) of the two-dimensional image display device 4.

Figure 12:
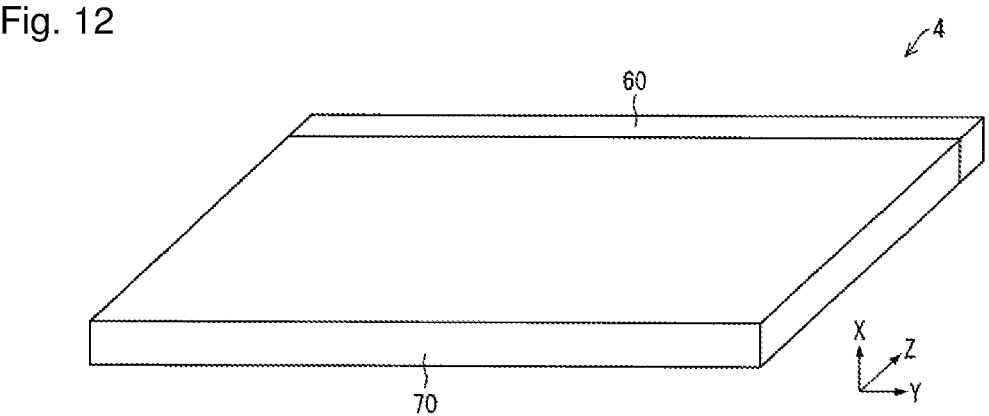
FIG. 12 is a perspective view illustrating a configuration of a two-dimensional image display device provided in the display apparatus.

FIG. 12 is a perspective view illustrating a configuration of the two-dimensional image display device 4. FIG. 13 is a sectional view of the two-dimensional image display device 4 cut along a plane parallel to the XY plane. FIG. 14 is a plan view illustrating the configuration of the two-dimensional image display device 4.

Figure 13:
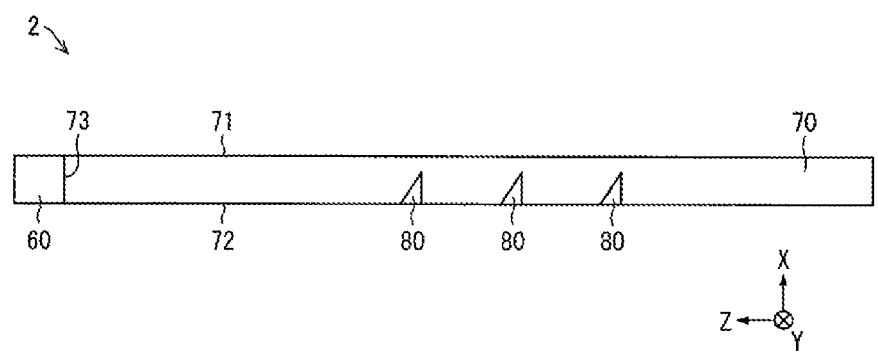
FIG. 13 is a sectional view of the two-dimensional image display device cut along a plane parallel to an XY plane.
Figure 14:
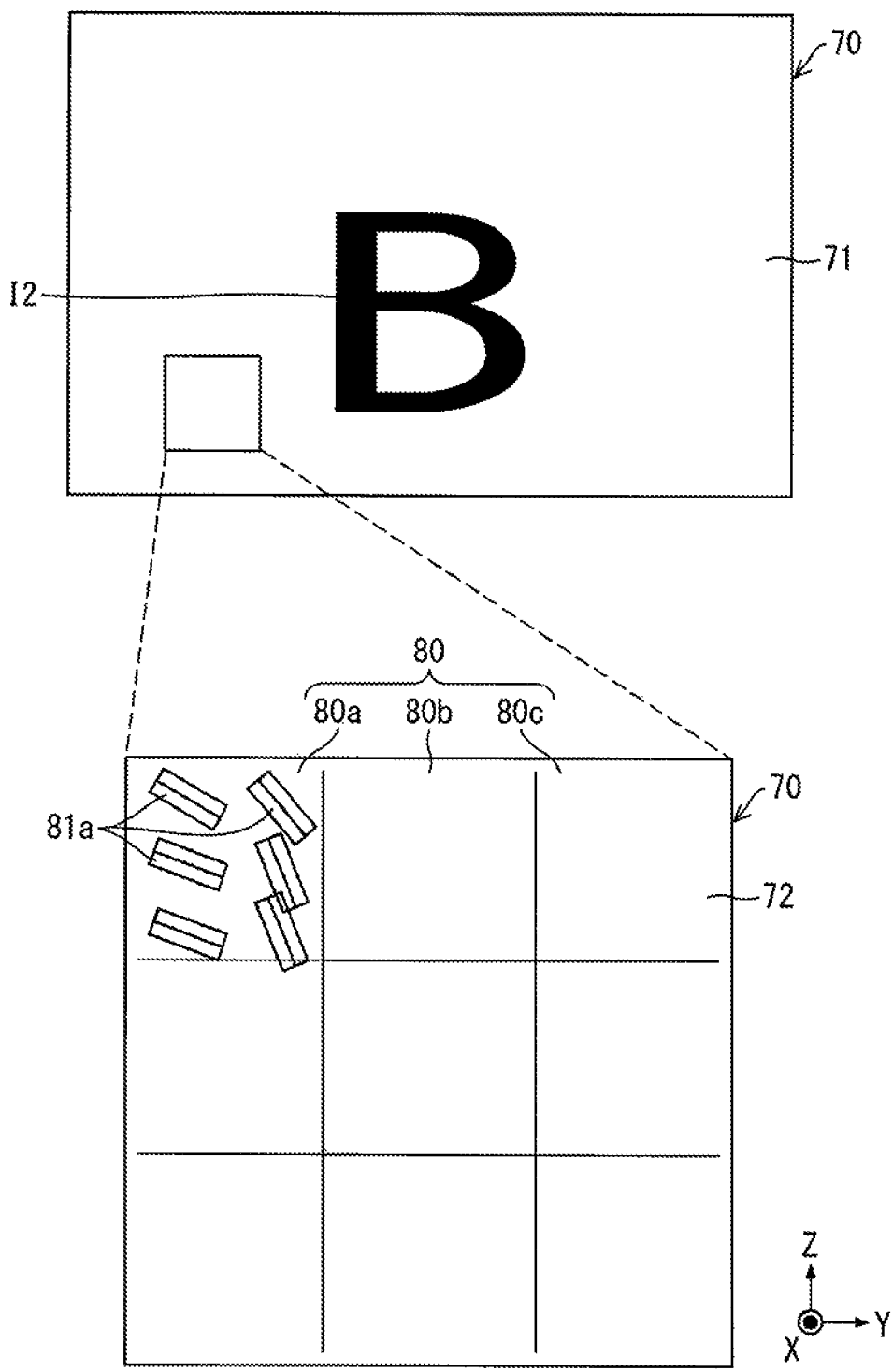
FIG. 14 is a plan view illustrating the configuration of the two-dimensional image display device.

As illustrated in FIGS. 12 and 13, the first stereoscopic image display device 2 includes a light source 60 and a light guide plate 70.

The light source 60 is a member for irradiating the light guide plate 70 with light and is formed of, for example, a light emitting diode (LED). The light source 60 may be configured to include one light emitting diode or may be configured a plurality of light emitting diodes. The light source 60 is disposed in the upper portion of the light guide plate 70.

The light guide plate 70 is a member that guides light incident from the light source 60 and has a substantially rectangular parallelepiped shape. The light guide plate 70 is molded with a transparent resin material having a relatively high refractive index. As a material for forming the light guide plate 70, for example, a polycarbonate resin, a methacrylate resin, or the like can be used. In the present embodiment, the light guide plate 70 is molded with a methacrylate resin.

As illustrated in FIG. 13, the light guide plate 70 includes an outgoing surface 71, a rear surface 72, and an incident surface 73.

The outgoing surface 71 is a surface that emits light guided inside the light guide plate 70, the light changed in its optical path by a second optical path changing unit 80 described later. The outgoing surface 71 constitutes the front-side surface (front surface) of the light guide plate 70.

The rear surface 72 is a surface parallel to the outgoing surface 71 and is a surface on which the second optical path changing unit 80 is disposed. The detail of the second optical path changing unit 80 will be described later.

The incident surface 73 is a surface where light emitted from the light source 60 enters the inside of the light guide plate 20. The incident surface 73 is the side surface of the upper portion of the light guide plate 70. In the two-dimensional image display device 4, light emitted from the light source 60 is incident on the light guide plate 70 from the upper portion of the light guide plate 70.

The second optical path changing unit 80 is disposed on the rear surface 72 inside the light guide plate 70 and is a member for changing the optical path of the light guided in the light guide plate 70. As illustrated in FIG. 14, the second optical path changing unit 80 is made up of optical path changing unit groups 80a, 80b, 80c . . . provided in the respective sections of the rear surface 72. Note that FIG. 14 only illustrates the optical path changing unit groups 80a to 80c for the sake of simplicity.

Each of the optical path changing unit groups 80a, 80b, 80c . . . is formed of a plurality of reflectors. For example, the optical path changing unit group 80a is made up of a plurality of reflectors 81a. Similarly, the optical path changing unit groups 80b, 80c . . . are made up of a plurality of reflectors, respectively.

A set of a plurality of dots indicates the two-dimensional image I2 displayed by the two-dimensional image display device 4. Each of the optical path changing unit groups 80a, 80b, 80c . . . forms an image of the plurality of dots. For example, one dot is a one-point image formed by the light reflected by each of the plurality of reflectors 81a of the optical path changing unit group 80a converging to one point on the outgoing surface 71. In the two-dimensional image display device 4, by accumulating a plurality of point images formed by the respective optical path changing unit groups 80a, 80b, 80c . . . , the two-dimensional image I2 apparently indicating the plane image is displayed.

As described above, the display apparatus 1A is configured to include the first stereoscopic image display device 2, the second stereoscopic image display device 3, and the two-dimensional image display device 4. Therefore, while the first stereoscopic image display device 2 and the second stereoscopic image display device 3 display the stereoscopic image I1 (the stereoscopic image I1a and the stereoscopic image I1b), the two-dimensional image display device 4 displays the two-dimensional image I2. Thereby, for example, by displaying a character (e.g., "EXIT") that indicates a facility or an image that illustrates the facility as the two-dimensional image I2, and displaying an arrow that indicates the direction in which the facility is located as the stereoscopic image I1, it is possible to perform a display intuitively (sensuously) easy for the observers O1, O2 to understand.

The display apparatus 1A has the configuration in which the two stereoscopic image display devices (the first stereoscopic image display device 2 and the second stereoscopic image display device 3) are superimposed to display the stereoscopic image I1. However, the present invention is not limited to this. For example, in one aspect of the display apparatus of the present invention, three or more stereoscopic image display devices may be superimposed to display the stereoscopic image I1.

Second Embodiment

Another embodiment of the present invention will be described as follows. For the convenience of description, members having the same functions as the members described in the above embodiment are denoted by the same reference numerals, and the description thereof will be omitted.

A configuration of a display apparatus 1B in the present embodiment will be described with reference to FIGS. 15 and 16.

Figure 15:
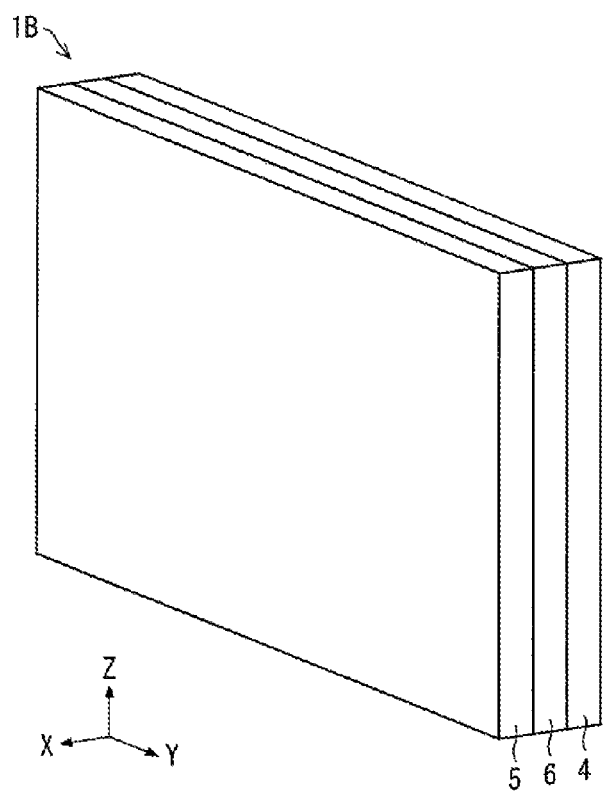
FIG. 15 is a perspective view illustrating a configuration of a display apparatus according to a second embodiment of the present invention.

FIG. 15 is a perspective view illustrating the configuration of the display apparatus 1B.

The display apparatus 1B includes a first stereoscopic image display device (optical device) 5 and a second stereoscopic image display device (optical device) 6 instead of the first stereoscopic image display device 2 and the second stereoscopic image display device 3 in the first embodiment.

The first stereoscopic image display device 5 and the second stereoscopic image display device 6 will be described with reference to FIG. 16. Since the first stereoscopic image display device 5 and the second stereoscopic image display device 6 have structures symmetrical to each other, the detail of the first stereoscopic image display device 5 will be described here, and concerning the difference of the second stereoscopic image display device 6, only the difference from the first stereoscopic image display device 5 will be described.

Figure 16:
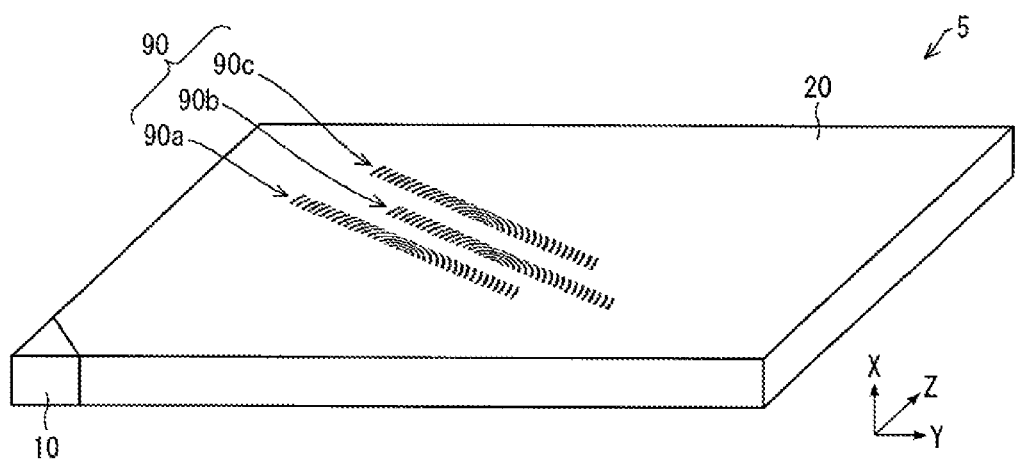
FIG. 16 is a perspective view illustrating a configuration of the first stereoscopic image display device provided in the display apparatus.

FIG. 16 is a perspective view illustrating the configuration of the first stereoscopic image display device 5.

As illustrated in FIG. 16, the first stereoscopic image display device 5 includes a first optical path changing unit 90 instead of the first optical path changing unit 30 in the first stereoscopic image display device 2.

The first optical path changing unit 90 is disposed on the rear surface 22 inside the light guide plate 20 and is a member for changing the optical path of the light guided in the light guide plate 20 to emit the light from the outgoing surface 21. As illustrated in FIG. 16, the first optical path changing unit 90 is made up of optical path changing unit groups (optical path changing units) 90a, 90b, 90c . . . . Note that FIG. 16 only illustrates the optical path changing unit groups 90a to 90c for the sake of simplicity.

Each of the optical path changing unit groups 90a, 90b, 90c . . . is provided along the direction parallel to the incident surface 23, and is each formed of a part of the Fresnel lens.

Next, a method for forming the stereoscopic image I1a by the first stereoscopic image display device 5 will be described with reference to FIG. 17. Here, as illustrated in FIG. 17, forming the line image LI of the character "A" will be described.

Figure 17:
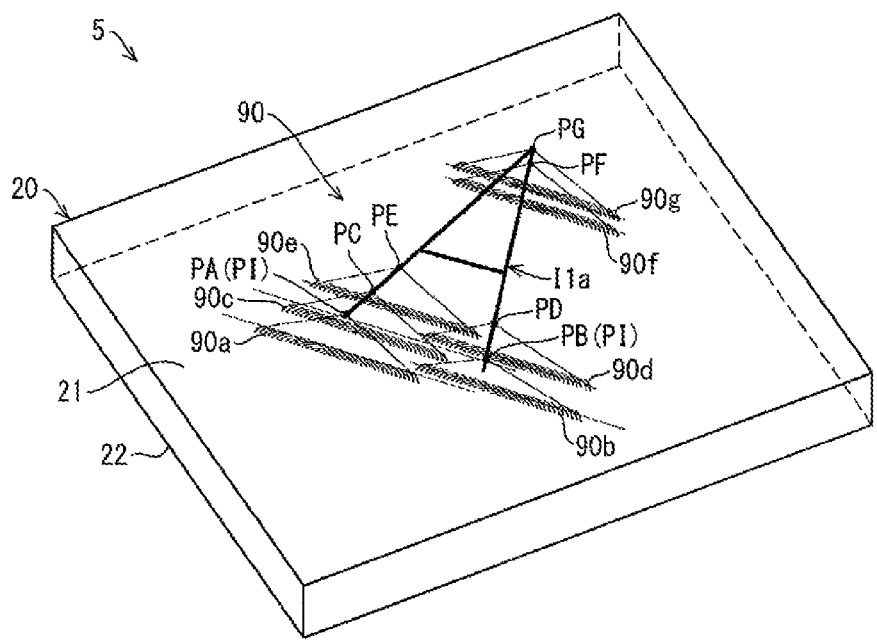
FIG. 17 is a perspective view illustrating a method for forming a stereoscopic image by the first stereoscopic image display device.

FIG. 17 is a perspective view illustrating a method for forming the stereoscopic image I1a by the first stereoscopic image display device 5. Note that FIG. 17 illustrates the optical path changing unit groups 90a to 90g among the optical path changing unit groups 90a, 90b, 90c . . . .

In the first stereoscopic image display device 5, the optical path changing unit groups 90a to 90g substantially converge light incident on each of the positions of the optical path changing unit groups 90a to 90g at each of definite points respectively corresponding to the optical path changing unit groups 90a to 90g. FIG. 17 illustrates a state in which a plurality of light rays from the optical path changing unit groups 90a to 90g converge.

Specifically, the optical path changing unit group 90a corresponds to a point image PI of a definite point PA of the stereoscopic image I1a, and light rays from the respective positions of the optical path changing unit group 90a converge to the definite point PA of the stereoscopic image I1a. As a result, the point image PI which is a part of the stereoscopic image I1a is formed at the definite point PA. Likewise, a point image PI, which is a part of the stereoscopic image I1a, is formed at each of definite points PB to PG by light changed in its optical path by each of the optical path changing unit groups 90b to 90g. In the first stereoscopic image display device 5, by reducing the distances among the optical path changing unit groups 90a, 90b, 90c . . . , the distance of the point image PI to be formed by each of the optical path changing unit groups 90a, 90b, 90c can be reduced. As a result, in the first stereoscopic image display device 5, by accumulating a plurality of point images PI each formed by the light changed in its optical path by each of the optical path changing unit groups 90a, 90b, 90c . . . , the stereoscopic image I1a, which is the line image, is substantially formed on the stereoscopic image formed plane P.

In the first stereoscopic image display device 5, similarly to the first stereoscopic image display device 2 in the first embodiment, in a plan view from the direction vertical to the outgoing surface 21, when the four quadrants taking the position of each of the optical path changing unit groups 90a, 90b, 90c . . . as the origin are specified, the four quadrants being divided by two straight lines orthogonal to each other and inclined 45° with respect to the direction in which the incident light from the light source 10 is incident on each of the optical path changing unit groups 90a, 90b, 90c . . . , each of the optical path changing unit groups 90a, 90b, 90c . . . is formed so that a part of the light reflected by each of the optical path changing unit groups 90a, 90b, 90c . . . is emitted to the quadrant (assumed to the fourth quadrant) adjacent to a quadrant (assumed to be the third quadrant) on which the incident light is incident.

As a result, in the first stereoscopic image display device 5, by each light emitted toward the fourth quadrant, the stereoscopic image I1a can be formed in the space in front of the light guide plate 20 and on the right side with respect to the direction normal to the front surface of the light guide plate 20. At this time, since the light source 10 is disposed at the lower left of the light guide plate 20, it is possible to reduce the angle formed between the incident direction of the incident light on each of the optical path changing unit groups 90a, 90b, 90c . . . and the outgoing direction of the outgoing light from each of the optical path changing unit groups 90a, 90b, 90c. As a result, the spreading sensitivity to the shape of the stereoscopic image I1a can be reduced, so that the observer O1 can recognize the undistorted stereoscopic image I1a, even when the observer O1 views the stereoscopic image I1a from an angle being a high angle with respect to the direction normal to the front surface of the light guide plate 20.

In addition, in the first stereoscopic image display device 5, each light emitted toward the fourth quadrant forms, in the air, the stereoscopic image I1a which is visually recognized by the observer O1 being in the range below the display apparatus 1B, in front of the display apparatus 1B, and on the right side from the horizontal center of the display apparatus 1B. Accordingly, when the display apparatus 1B is installed at a position higher than the eye level of the observer O1, the observer O1 can visually recognize the stereoscopic image I1a.

In addition, as described above, the second stereoscopic image display device 6 has the structure symmetrical to the first stereoscopic image display device 5. With this configuration, the second stereoscopic image display device 6 can form the stereoscopic image I1b in the space in front of the display apparatus 1B and on the left side with respect to the direction normal to the front surface of the display apparatus 1B. Further, even when the observer O2 views the stereoscopic image I1b from an angle being a high angle with respect to the direction normal to the front surface of the display apparatus 1B, the observer O2 can recognize the undistorted stereoscopic image I1b. Moreover, when the display apparatus 1B is installed at a position higher than the eye level of the observer O2, the observer O2 can view the stereoscopic image I1b.

Third Embodiment

Another embodiment of the present invention will be described as follows. For convenience of description, members having the same functions as the members described in the above embodiment are denoted by the same reference numerals, and the description thereof is omitted.

A configuration of a display apparatus 1C in the present embodiment will be described with reference to FIGS. 18 and 19.

Figure 18:
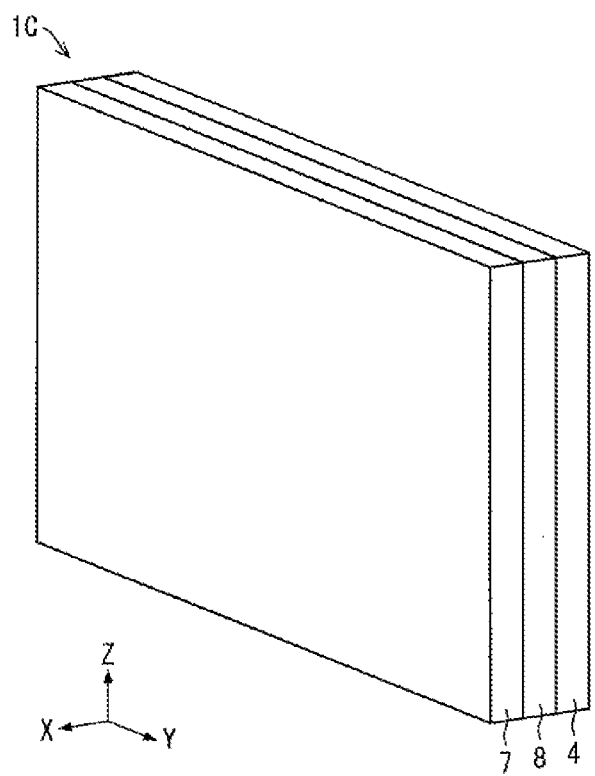
FIG. 18 is a perspective view illustrating a configuration of a display apparatus according to a third embodiment of the present invention.

FIG. 18 is a perspective view illustrating the configuration of the display apparatus 1C.

The display apparatus 1C includes a first stereoscopic image display device (optical device) 7 and a second stereoscopic image display device (optical device) 8 instead of the first stereoscopic image display device 2 and the second stereoscopic image display device 3 in the first embodiment.

The first stereoscopic image display device 7 and the second stereoscopic image display device 8 will be described with reference to FIG. 19. Since the first stereoscopic image display device 7 and the second stereoscopic image display device 8 have structures symmetrical to each other, the detail of the first stereoscopic image display device 7 will be described here, and concerning the difference of the second stereoscopic image display device 8, only the difference from the first stereoscopic image display device 5 will be described.

Figure 19:
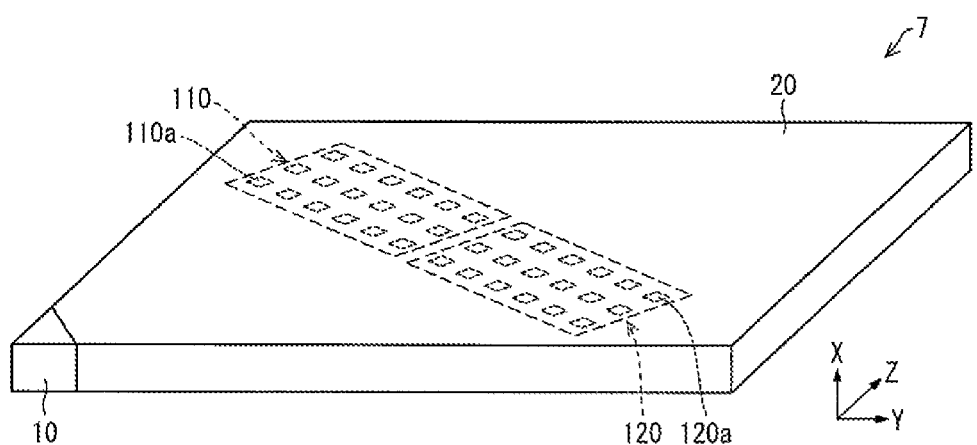
FIG. 19 is a perspective view illustrating the configuration of the first stereoscopic image display device provided in the display apparatus.

FIG. 19 is a perspective view illustrating the configuration of the first stereoscopic image display device 7.

As illustrated in FIG. 19, the first stereoscopic image display device 7 includes a third optical path changing unit 110 and a fourth optical path changing unit 120 instead of the first optical path changing unit 30 in the first stereoscopic image display device 2.

Each of the third optical path changing unit 110 and the fourth optical path changing unit 120 is disposed on the rear surface 22 inside the light guide plate 20 and is a member for changing the optical path of the light guided in the light guide plate 20 to emit the light from the outgoing surface 21. The third optical path changing unit 110 is made up of a plurality of reflectors (optical path changing units) 110a. Similarly, the fourth optical path changing unit 120 is made up of a plurality of reflectors (optical path changing units) 120a.

Figure 20:
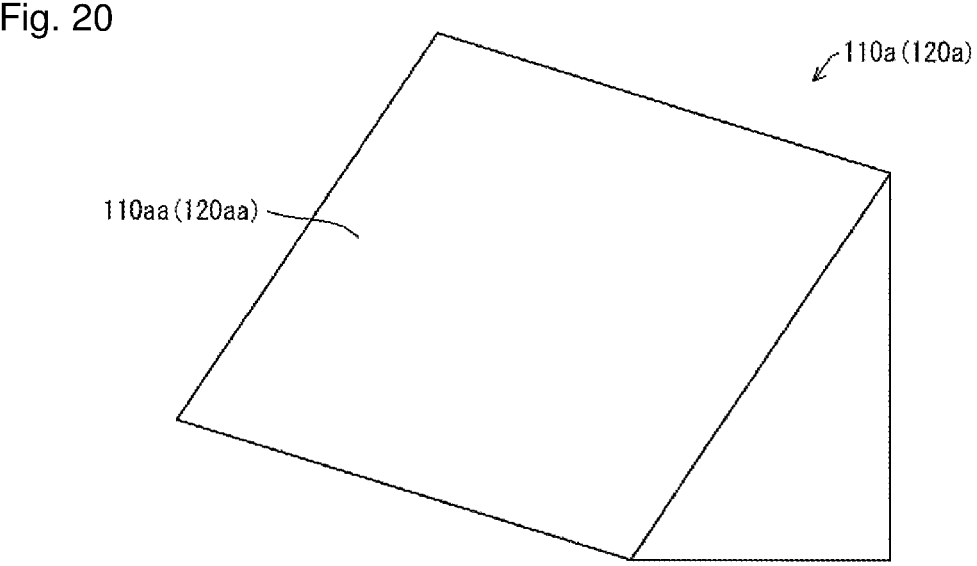
FIG. 20 is a perspective view illustrating the structure of the reflector included in the first stereoscopic image display device.
Figure 21:
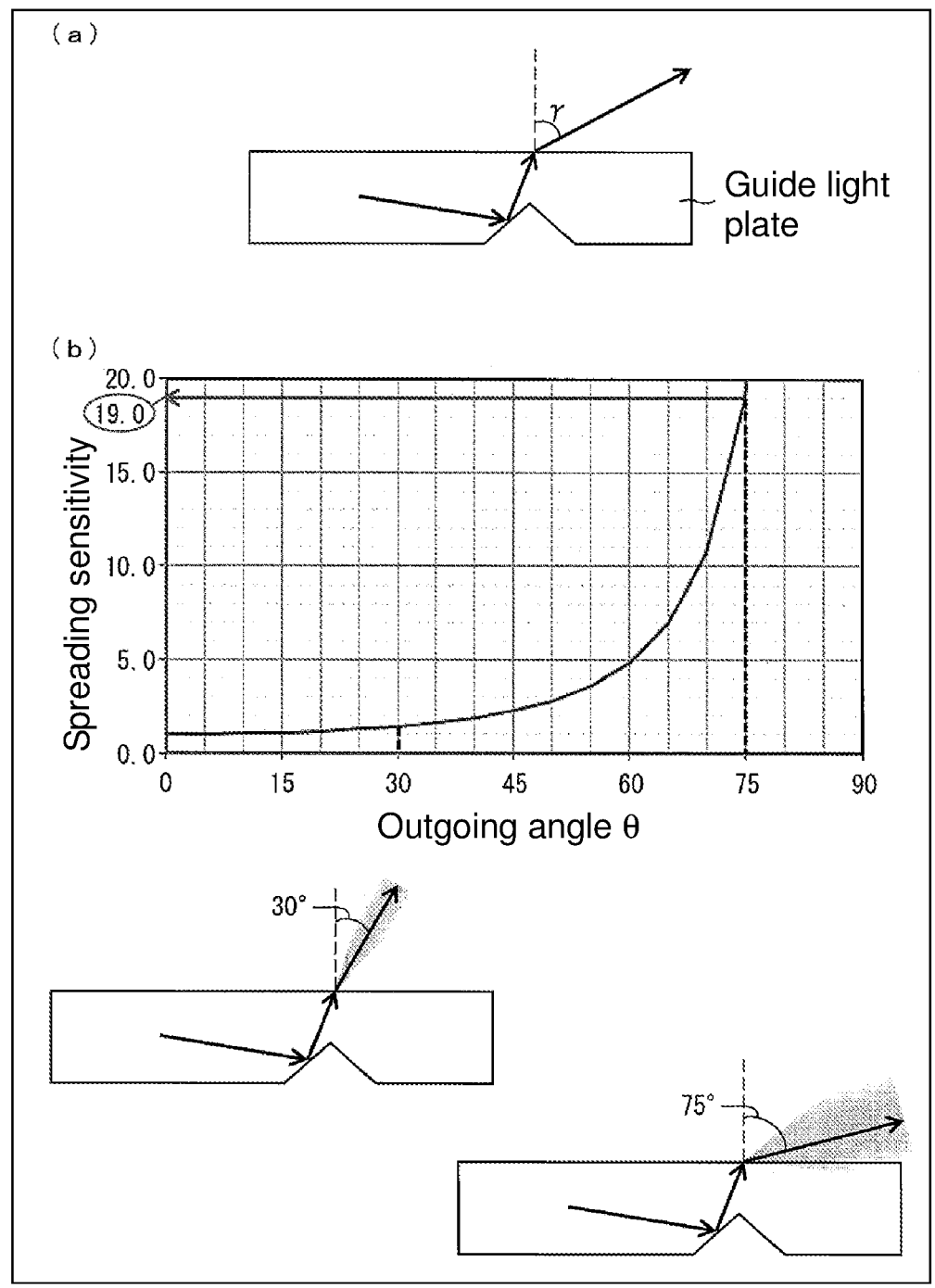
FIGS. 21(a) and 21(b) are diagrams for explaining the reason why visibility of a stereoscopic image at a high viewing angle deteriorates.

FIG. 20 is a perspective view illustrating the structure of each of the reflectors 110a, 120a.

As illustrated in FIG. 20, the reflectors 110a, 120a have triangular pyramidal shapes, and have reflective surfaces 110aa, 120aa that reflect (totally reflect) the incident light. The reflective surfaces 110aa, 120aa are formed so that the angle formed between each of the reflective surfaces 110aa, 120aa and the light outgoing surface 21 or the rear surface 22 of the light guide plate 20 is equal to or larger than a predetermined angle (48° in the present embodiment).

In the first stereoscopic image display device 7, a first image is formed on the outgoing surface 21 side by the light changed in its optical path by the third optical path changing unit 110, and a second image which is the same as the first image is formed on the outgoing surface 21 side by the light changed in its optical path by the fourth optical path changing unit 120. However, the positions where the first image and the second image are formed are different from each other. With the above configuration, the observer O1 is caused to visually recognize the first image with the right eye and the second image with the left eye in the first stereoscopic image display device 7, whereby the observer O1 can visually recognize a stereoscopic image due to parallax.

In the first stereoscopic image display device 7, similarly to the first stereoscopic image display device 2 in the first embodiment, in a plan view from the direction vertical to the outgoing surface 21, when the four quadrants taking the position of each of the third optical path changing unit 110 and the fourth optical path changing unit 120 as the origin are specified, the four quadrants being divided by two straight lines orthogonal to each other and inclined 45° with respect to the direction in which the incident light from the light source 10 is incident on each of the third optical path changing unit 110 and the fourth optical path changing unit 120, each of the third optical path changing unit 110 and the fourth optical path changing unit 120 is formed so that a part of the light reflected by each of the third optical path changing unit 110 and the fourth optical path changing unit 120 is emitted to the quadrant (assumed to the fourth quadrant) adjacent to a quadrant (assumed to be the third quadrant) on which the incident light is incident.

As a result, in the first stereoscopic image display device 7, each light emitted toward the fourth quadrant can cause the observer O1 to visually recognize the stereoscopic image I1a, the observer being in the space in front of the light guide plate 20 and on the right side with respect to the direction normal to the front surface of the light guide plate 20. At this time, the light source 10 is disposed at the lower left of the light guide plate 20, so that it is possible to reduce the angle formed between the line normal to each of the reflective surfaces 110aa, 120aa . . . and the incident direction of the incident light. That is, when the YZ plane is viewed in a plan view, the angle formed between the incident direction of the incident light on the third optical path changing unit 110 or the fourth optical path changing unit 120 and the outgoing direction of the outgoing light from the third optical path changing unit 110 or the fourth optical path changing unit 120 can be made smaller. As a result, the spreading sensitivity to the shape of the stereoscopic image I1a can be reduced, so that the observer O1 can recognize the undistorted stereoscopic image I1a, even when the observer O1 views the stereoscopic image I1a from an angle being a high angle with respect to the direction normal to the front surface of the light guide plate 20.

In addition, in the first stereoscopic image display device 7, each light emitted toward the fourth quadrant causes the observer O1 to visually recognize the stereoscopic image I1a, the observer O1 being in the range below the display apparatus 1C, in front of the display apparatus 1C, and on the right side from the horizontal center of the display apparatus 1C. Thereby, when the display apparatus 1C is installed at a position higher than the eye level of the observer O1, the observer O1 can view the stereoscopic image I1a.

In addition, as described above, the second stereoscopic image display device 8 has the structure symmetrical to the first stereoscopic image display device 7. With this configuration, the second stereoscopic image display device 8 causes the observer O2 to visually recognize the stereoscopic image I1b, the observer O2 being in the range in front of the display apparatus 1C and on the left side with respect to the direction normal to the front surface of the display apparatus 1C. Further, even when the observer O2 views the stereoscopic image I1b from an angle being a high angle with respect to the direction normal to the front surface of the display apparatus 1C, the observer O2 can recognize the undistorted stereoscopic image I1b. Moreover, when the display apparatus 1C is installed at a position higher than the eye level of the observer O2, the observer O2 can view the stereoscopic image I1b.

Summary

An optical device according to one aspect of the present invention is provided with a light guide plate configured to guide incident light and emit the light from an outgoing surface. The light guide plate includes a plurality of optical path changing units each configured to change an optical path of the light guided into the light guide plate and emit the light from the outgoing surface, and the optical device causes an observer to recognize the light changed in the optical path by each of the plurality of optical path changing units and emitted from the outgoing surface as a stereoscopic model. When four quadrants are specified for each of the optical path changing units, the four quadrants taking a position of the optical path changing unit as an origin in a plan view from a direction vertical to an outgoing surface, the four quadrants being divided by two straight lines orthogonal to each other and inclined 45° with respect to a direction in which the incident light is incident on the optical path changing unit, the light changed in the optical path by the optical path changing unit is emitted to a quadrant adjacent to a quadrant on which incident light is incident.

According to the above feature, the stereoscopic model visually recognized by the observer by the light emitted to the quadrant adjacent to the quadrant on which the incident light is incident is formed by the light with a small angle formed between the incident direction of the incident light on the optical path changing unit and the outgoing direction of the outgoing light from the optical path changing unit. As a result, the spreading sensitivity to the shape of the stereoscopic model can be reduced, so that the observer existing in the quadrant adjacent to the quadrant on which the incident light enters can recognize an undistorted stereoscopic model. Accordingly, by appropriately setting the incident angle of the light on the optical path changing unit, it is possible to cause the observer to recognize an undistorted stereoscopic model, even when the observer views a stereoscopic model from an angle being a high angle with respect to the direction normal to the front surface of the light guide plate.

The optical device according to one aspect of the present invention may have a configuration in which the light, changed in the optical path by each of the plurality of optical path changing units and emitted from the outgoing surface, forms an image to form a stereoscopic model.

The optical device according to one aspect of the present invention may have a configuration in which the light, changed in the optical path by each of the plurality of optical path changing units and emitted from the outgoing surface, is recognized by the observer as a stereoscopic model due to parallax.

A display apparatus according to one aspect of the present invention has a configuration in which a plurality of optical devices are superimposed.

With the above configuration, a plurality of stereoscopic models can be recognized in one display apparatus.

The display apparatus according to one aspect of the present invention has a configuration in which an angular range in which one of the plurality of optical devices emits light is different from an angular range in which the other of the optical devices emits light.

With the above configuration, in one display apparatus, each optical device can cause the observer being at a different position to recognize a stereoscopic model.

The display apparatus according to one aspect of the present invention may have a configuration in which the plurality of optical devices display the same stereoscopic models with respect to mutually different angular ranges.

With the above configuration, it is possible to cause the observer to recognize the same stereoscopic model with a wide viewing angle.

The display apparatus according to one aspect of the present invention may have a configuration in which a two-dimensional image display device configured to display a two-dimensional image is further superimposed.

With the above configuration, the optical device can display a stereoscopic model, and the two-dimensional image display device can display a two-dimensional image. Thereby, for example, by displaying a character that indicates a place or an image that illustrates the place as a two-dimensional image, and displaying an arrow as a stereoscopic model, it is possible to perform a display intuitively (sensuously) easy for the observer to understand.

The present invention is not limited to each of the embodiments described above, but can be subjected to a variety of changes in the scope shown in the claims. An embodiment obtained by appropriately combining technical units disclosed respectively in different embodiments is also included in a technical scope of the present invention.

Description of Symbols 2, 5, 7 First stereoscopic image display device (optical device)
3, 6, 8 Second stereoscopic image display device (optical device)
4 Two-dimensional image display device
20 light guide plate
21 Outgoing surface
31a, 31b, 31c, 110a, 120a reflector (optical path changing unit)
90a, 90b, 90c Optical path changing unit group (optical path changing unit)
I1, I1a, Ib Stereoscopic image (stereoscopic model)
O1, O2 Observer

The invention claimed is:

1. An optical device comprising
a light guide plate configured to guide incident light and emit the light from an outgoing surface,
the light guide plate including a plurality of optical path changing units each configured to change an optical path of the light guided into the light guide plate and emit the light from the outgoing surface,
the optical device causing an observer to recognize, as a stereoscopic model, the light changed in the optical path by each of the plurality of optical path changing units and emitted from the outgoing surface,
wherein, when four quadrants are specified for each of the optical path changing units, the four quadrants taking a position of the optical path changing unit as an origin in a plan view from a direction vertical to an outgoing surface, the four quadrants being divided by two straight lines orthogonal to each other and inclined 45° with respect to a direction in which the incident light is incident on the optical path changing unit, the light changed in the optical path by the optical path changing unit is emitted to a quadrant adjacent clockwise to a quadrant on which incident light is incident or is emitted to a quadrant adjacent counterclockwise to the quadrant on which incident light is incident.

2. The optical device according to claim 1, wherein the light, changed in the optical path by each of the plurality of optical path changing units and emitted from the outgoing surface, forms an image to form a stereoscopic model.

3. The optical device according to claim 1, wherein the light, changed in the optical path by each of the plurality of optical path changing units and emitted from the outgoing surface, is recognized by the observer as a stereoscopic model due to parallax.

4. A display apparatus comprising
a plurality of the optical devices according to claim 1 that are superimposed.

5. The display apparatus according to claim 4, wherein an angular range in which one of the plurality of optical devices emits light is different from an angular range in which the other of the optical devices emits light.

6. The display apparatus according to claim 5, wherein the plurality of optical devices display the same stereoscopic models with respect to mutually different angular ranges.

7. The display apparatus according to claim 4, wherein a two-dimensional image display device configured to display a two-dimensional image is further superimposed.

8. A display apparatus comprising
a plurality of the optical devices according to claim 2 that are superimposed.

9. A display apparatus comprising
a plurality of the optical devices according to claim 3 that are superimposed.

10. The display apparatus according to claim 8, wherein an angular range in which one of the plurality of optical devices emits light is different from an angular range in which the other of the optical devices emits light.

11. The display apparatus according to claim 9, wherein an angular range in which one of the plurality of optical devices emits light is different from an angular range in which the other of the optical devices emits light.

12. The display apparatus according to claim 10, wherein the plurality of optical devices display the same stereoscopic models with respect to mutually different angular ranges.

13. The display apparatus according to claim 11, wherein the plurality of optical devices display the same stereoscopic models with respect to mutually different angular ranges.

14. The display apparatus according to claim 5, wherein a two-dimensional image display device configured to display a two-dimensional image is further superimposed.

15. The display apparatus according to claim 6, wherein a two-dimensional image display device configured to display a two-dimensional image is further superimposed.

* * * * *